United States Patent
Boyhont et al.

[15] 3,704,917
[45] Dec. 5, 1972

[54] PULVERULENT MATERIAL CONVEYING APPARATUS

[72] Inventors: Donald S. Boyhont, Nazareth; Marvyn L. Souders, Allentown, both of Pa.

[73] Assignee: Fuller Company

[22] Filed: Oct. 14, 1970

[21] Appl. No.: 80,727

[52] U.S. Cl. ................................................. 302/50
[51] Int. Cl. ........................ B65g 53/08, B65g 53/48
[58] Field of Search ........................ 198/214; 302/50

[56] References Cited

UNITED STATES PATENTS

| | | | |
|---|---|---|---|
| 2,489,090 | 11/1949 | Gurney et al. | 302/50 |
| 1,002,556 | 9/1911 | Bernert | 302/50 X |
| 672,409 | 4/1901 | Scheidegger | 302/50 X |
| 3,184,112 | 5/1965 | Loeser | 198/214 X |
| 3,508,683 | 4/1970 | Van der Schee | 198/214 X |
| 3,314,733 | 4/1967 | Page | 302/50 |

FOREIGN PATENTS OR APPLICATIONS

| | | | |
|---|---|---|---|
| 524,415 | 4/1931 | Germany | 302/50 |

*Primary Examiner*—Evon C. Blunk
*Assistant Examiner*—W. Scott Carson
*Attorney*—Jack L. Prather and Frank H. Thomson

[57] ABSTRACT

A pulverulent material conveying apparatus which includes a hollow barrel having an inlet which is adapted to be connected to a source of pulverulent material and an outlet for discharging material into a manifold chamber. A screw conveyor is rotatably mounted in the barrel for advancing the material through the barrel. Each end of the screw is mounted in bearings. The end of the screw near the outlet of the barrel is tapered so that the pulverulent material is compressed to form a fluid seal at the outlet of the barrel. A check valve is slideably mounted on the screw shaft to restrict the flow of material from the barrel into the manifold chamber. Air under pressure is supplied to the manifold chamber where it aerates the pulverulent material and entrains the material to the outlet of the manifold chamber and the conveying line. The outlet of the manifold chamber is coaxial with the barrel, and the air under pressure is supplied to the manifold chamber so that a substantially complete circle of air under pressure is formed around the outlet of the barrel.

8 Claims, 3 Drawing Figures

INVENTORS
DONALD S. BOYHONT &
MARVYN L. SOUDERS

BY Frank H Thomson
Jack L. Prather
ATTORNEY

INVENTORS
DONALD S. BOYHONT &
MARVYN L. SOUDERS

BY Frank H. Thomson
Jack L. Prather
ATTORNEY

3,704,917

PULVERULENT MATERIAL CONVEYING APPARATUS

BACKGROUND OF THE INVENTION

This invention relates to pulverulent material conveying apparatus and in particular to an improved pneumatic conveying apparatus of the type shown in U.S. Pat. No. 1,553,539.

The type of pulverulent material conveying apparatus to which the present invention relates is generally known in the prior art and has been a successful pulverulent material conveying apparatus for many years. In such apparatus, pulverulent material to be conveyed is advanced by means of a screw feeder from a source of material through a barrel to a wind box. Air under pressure is continuously supplied to the wind box to aerate and entrain the pulverulent material through a conveying line which is flow connected with the wind box. The screw and barrel are designed so that the material is compressed to thereby form a material seal which prevents the air under pressure from backing up through the barrel.

It has become common practice to support the screw for conveying the material through the pumping apparatus only at the drive motor end of the screw and rely on the pulverulent material between the screw and the barrel to form a bearing for supporting the other end of the screw. Such an arrangement is satisfactory so long as the pump screw is properly aligned and balanced and the apparatus is working at or near capacity. In the event the apparatus is not operated under these ideal conditions, this bearing may not be formed. If the screw is not properly balanced and aligned in the barrel, the screw will tend to wobble in the barrel. This wobble can cause chips to break off the screw flight which cause the screw to become further out of balance and result in an increase in the wobble. Eventually, the screw will destroy itself.

When apparatus of the type to which the present invention relates was originally introduced, the screw shaft was supported at both ends by means of suitable bearings. The arrangements of the early apparatus of this type had the disadvantage that when the pump was operating at less than capacity, a material seal was not always formed in the barrel. The material seal at the discharge end of the barrel is essential for proper operation of the apparatus. In order to overcome this, a check valve was mounted at the discharge end of the barrel. This resulted in the elimination of the bearing at the discharge end of the screw.

An additional problem with prior apparatus of this type is that the conveying line to which material is supplied is usually offset from the outlet of the barrel. This is a result of the check valve arrangement used in prior apparatus. With the check valve arrangement used in prior apparatus, when the pulverulent material is discharged from the barrel, it will drop toward the bottom of the wind box, and the compressed air is supplied to the wind box primarily at the bottom of the wind box. Such an arrangement has the disadvantage that it does not utilize the flow pattern of the material leaving the barrel.

SUMMARY

It is, therefore, the principal object of this invention to provide a pneumatic conveying apparatus for pulverulent materials of the type wherein a screw conveyor feeds material into a wind box which overcomes the disadvantages of prior apparatus of this type.

It is a further object of this invention to provide a more efficient pulverulent material conveying apparatus of the type which employs a screw conveyor for feeding pulverulent material into a wind box wherein the apparatus is capable of operating at both full capacity and partial capacity without interfering with the operation of the device.

In general, the foregoing and other objects will be carried out by providing apparatus for conveying pulverulent material comprising: a hollow barrel having an inlet for material to be conveyed and an outlet; screw means rotatably mounted in said barrel for advancing material through said barrel from the inlet to the outlet and defining with said barrel means for compacting the material; bearing means for rotatably supporting said screw means; manifold means at the outlet of said barrel for receiving material from said barrel and having an outlet coaxially aligned with the outlet of said barrel and adapted to be connected to a material conveying line; means for supplying gaseous fluid under pressure to said manifold means for aerating said material and entraining said material through the outlet of the manifold means; said barrel extending into said manifold means and said means for supplying a gaseous fluid under pressure to said manifold means being located upstream of the outlet of the barrel so that a flow of gaseous fluid under pressure substantially completely surrounds the outlet of the barrel; and check valve means slideably mounted on said screw means for restricting the flow of material from the outlet of the barrel into said manifold means.

BRIEF DESCRIPTION OF THE DRAWINGS

The invention will be described in connection with the annexed drawings wherein.

DESCRIPTION OF THE PREFERRED EMBODIMENT

Figure 1:
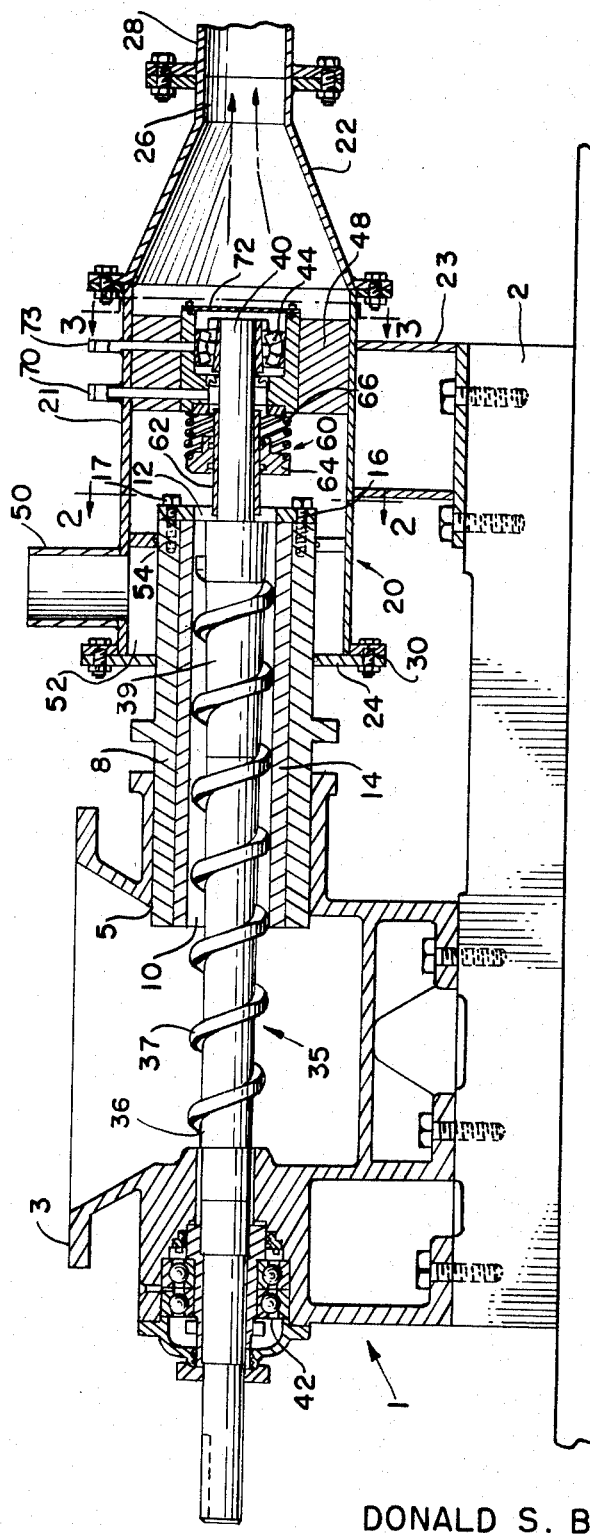
FIG. 1 is a sectional view of the conveying apparatus of the present invention.
Figure 2:
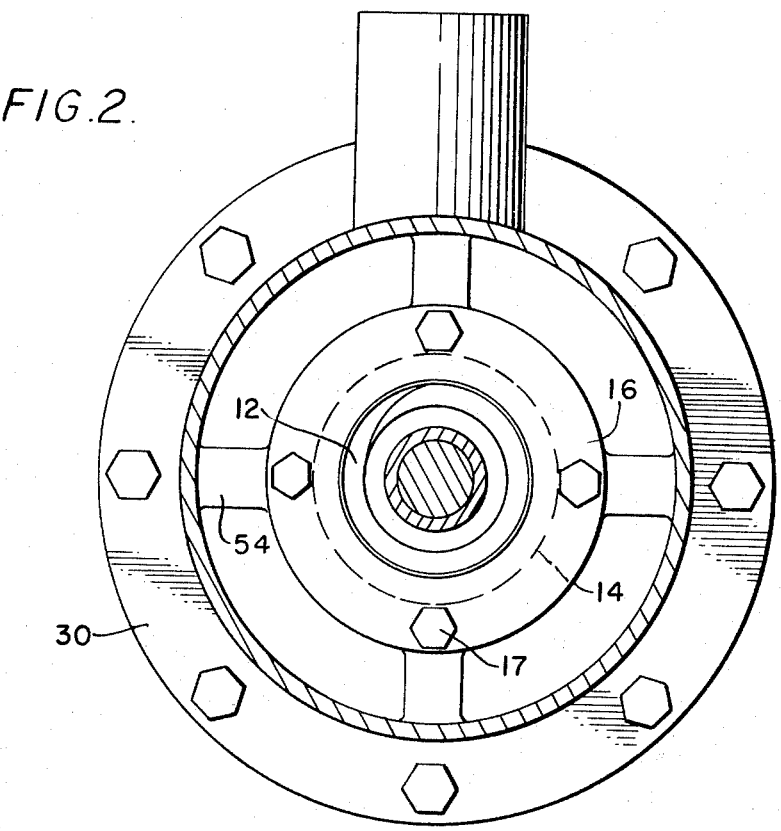
FIG. 2 is a sectional view taken on the line 2—2 of FIG. 1.
Figure 3:
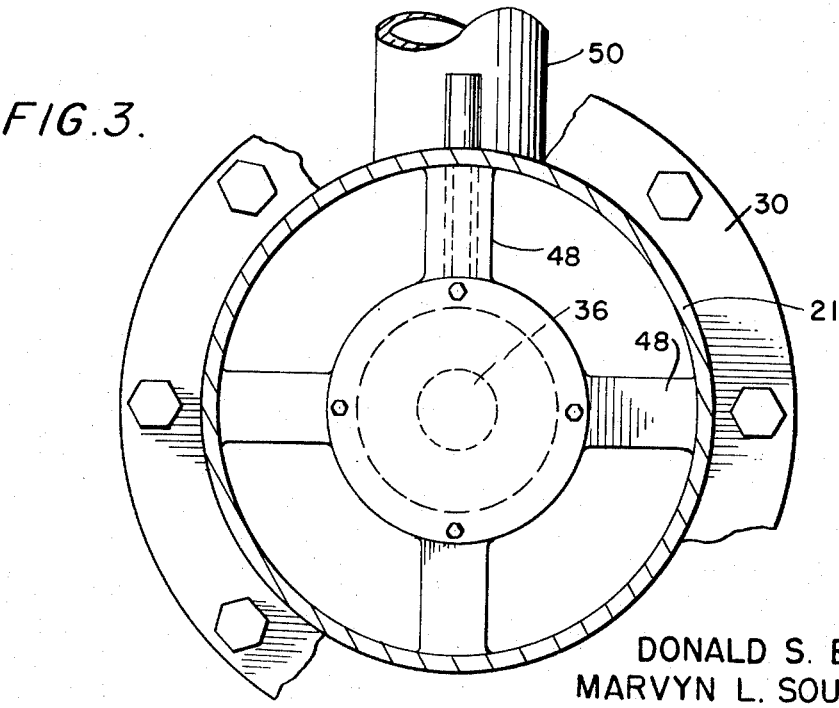
FIG. 3 is a sectional view taken on the line 3—3 of FIG. 1.

The pulverulent material conveying apparatus of the present invention includes a hopper section generally indicated at 1 which is suitably mounted on a base 2 and includes an inlet portion 3 adapted to be connected to a source of pulverulent material. The hopper section 1 is provided with a flanged opening 5 for receiving a barrel section 8. The hollow barrel section 8 has an inlet 10 communicating with the hopper 1 and an outlet 12. The barrel 8 may be provided with a hardened metal liner 14 held in place by means of a plate 16 and fasteners 17.

The forward or outlet end of the barrel 8 extends into a manifold chamber generally indicated at 20. The manifold chamber comprises a shell 21 having a conical portion 22 secured thereto. The shell 21 is secured to the base 2 by means of suitable support structure 23. The manifold chamber 20 is closed at its rearward end by means of an annular plate 24 which is secured to the shell 21 by means of a flange 30 and suitable fasteners. The chamber 20 has an outlet 26 at its forward end adapted to be connected to a conveying line 28. The outlet 26 of the manifold chamber is axially aligned with the outlet 12 of the barrel 8.

A screw means 35 including a shaft 36 and a helical flight 37 is rotatably mounted in the barrel 8. The end of the screw means 35 near the outlet 12 of the barrel 8 includes an outwardly tapered shaft portion 39 and an extension 40. The hopper section 1 is provided with bearing means 42 for rotatably supporting one end of the shaft 36. A second bearing 44 is mounted in the manifold chamber 20 by means of a spider 48 for rotatably supporting the forward end of the screw means 35. The bearings 42 and 44 insure that the screw means is properly aligned in the barrel 8. The rearward end of the shaft 36 is adapted to be connected to a source of rotary motion such as an electric motor.

The manifold chamber 20 is supplied with gaseous fluid such as air under pressure from a source (not shown) through an inlet conduit 50. When air enters the manifold 35 through conduit 50, it flows into an annular chamber 52 defined by the shell 21, barrel 8, endwall 24 and a spider 54. The annular chamber 52 is located upstream of the outlet 12 of the barrel so that as the air flows toward the outlet 26 of the manifold, the air completely surrounds the discharge 12 of the barrel 8.

A check valve means 60 is slideably mounted on a sleeve 62 which surrounds the shaft extension 40 of the screw means 35. The check valve includes a valve plate 64 which is biased towards the discharge 12 of the barrel 8 by means of a spring 66.

A conduit 70 is provided for supplying purge air to the bearing 44 and check valve means 60 for keeping pulverulent material away from these vital parts. A plate 72 is secured to the forward end of the bearing to prevent material from entering the bearing. A conduit 73 may be provided for supplying lubricant to the bearing 44.

In operation, material to be conveyed is supplied to the hopper 3. As the screw 35 rotates, the material is advanced from the hopper 3 through the barrel 8 to the discharge 12. The tapered portion 39 of the shaft 36 plus the constant diameter barrel 8 serve to compress the material in the barrel 8 to provide a material seal at the discharge 12 of the barrel which prevents air from leaving the manifold 20 and backing into the barrel 8 and hopper 3.

As the material moves through the barrel, it moves check valve 60 away from the discharge 12 against the biasing force of spring 66 and the material enters the manifold chamber 20. Air under pressure from conduit 50 is supplied to the manifold chamber by way of annular passage 52 and flows toward the outlet 26 so that it completely surrounds the pulverulent material exiting from the barrel 8. The material is aerated and entrained past the spider 48 and into the conveying line 28.

Because the air under pressure completely surrounds the discharge 12 of barrel 8 and the conveying line 28 axially aligned with the discharge of the barrel 8, a more efficient conveying apparatus is provided. The material does not tend to fall to the bottom of the manifold 20 where it would have to be picked up by the entraining air. The flow pattern of the material leaving the barrel 8 is utilized in conveying the material. The particular check valve arrangement used does not interfere with this flow pattern. The bearings 42 and 44 permit the apparatus to be operated at less than full capacity without resulting in self-destruction of the screw means 35. The material is not relied on to form a bearing.

It should be apparent that the objects of this invention have been carried out. It is intended that the foregoing be merely a description of the preferred form of the invention but that the invention be limited solely by that in the appended claims.

I claim:

1. Apparatus for conveying pulverulent material comprising:

a hollow barrel having an inlet for material to be conveyed and an outlet;

screw means rotatably mounted in said barrel for advancing material from the inlet to the outlet and defining with said barrel, means for compacting the material;

a pair of bearing means each mounted at one end of said screw means for rotatably supporting said screw means;

manifold means at the outlet of said barrel for receiving material from the barrel and having an outlet adapted to be connected to a material conveying line;

means for supplying gaseous fluid under pressure to said manifold means for aerating the material and entraining the material through the outlet of the manifold means; and check valve means slideably mounted on said screw means and biased toward the outlet of said barrel for restricting the flow of material from the outlet of the barrel into said manifold means;

one of said bearing means being mounted within said manifold means, downstream of the outlet of the barrel and upstream of the manifold outlet;

said check valve means being mounted between the barrel outlet and the bearing mounted within the manifold;

said means for supplying gaseous fluid being connected to said manifold means upstream of the bearing means mounted within the manifold.

2. The conveying apparatus of claim 1, wherein said manifold means is coaxially aligned with the outlet of said barrel and said means for supplying gaseous fluid to said manifold means is located upstream of the outlet of the barrel so that a flow of gaseous fluid substantially completely surrounds the outlet of the barrel.

3. The conveying apparatus of claim 1, wherein said barrel is substantially cylindrical and said screw means includes a shaft having a helical flight of substantially constant pitch and a portion near the outlet of the barrel tapered outwardly toward said barrel to define said means for compacting the material.

4. The conveying apparatus of claim 1, wherein a spider supports said bearing which is mounted within the manifold means and further comprising means for supplying a gaseous fluid under pressure to said manifold means for cleaning said check valve means.

5. Apparatus for conveying pulverulent material comprising:

a casing defining a manifold chamber having an outlet at one end thereof adapted to have a conveying line connected thereto;

barrel means extending into the other end of said casing and having an inlet for material to be conveyed and an outlet for discharging the material into the manifold chamber;

screw means rotatably mounted in said barrel and having a portion near the outlet of the barrel for compacting the material to thereby form a material seal;

a pair of bearing means, each rotatably supporting one end of said screw means with one of said bearing means being mounted by means of a spider in said manifold chamber;

means for supplying gaseous fluid under pressure to said manifold chamber upstream of the bearing means which is mounted in the manifold chamber for aerating the material and entraining the material to the outlet of the manifold chamber;

check valve means mounted within said manifold chamber upstream of the bearing means mounted within the manifold chamber for restricting the flow of material from said barrel into said manifold chamber; and means for supplying gaseous fluid under pressure to said bearing means mounted within said manifold chamber and said check valve.

6. The apparatus of claim 5, wherein said check valve means is slideably mounted on said screw means and is spring biased closed against the outlet of the barrel.

7. The conveying apparatus of claim 5, wherein said fluid supply means is connected to said manifold chamber upstream of the outlet of the barrel and said manifold chamber is dimensioned so that the flow of gaseous fluid substantially completely encircles the outlet of the barrel.

8. The apparatus of claim 7, wherein said screw means includes a shaft having a helical flight of substantially constant pitch and an outwardly tapered portion near the outlet of said barrel to define said means for compacting the material.

* * * * *